United States Patent [19]

Ege

[11] Patent Number: 4,563,563
[45] Date of Patent: Jan. 7, 1986

[54] TAPE SPLICER TO SPLICE CARRIER STRIP

[75] Inventor: Sigmund Ege, Oslo, Norway

[73] Assignee: Kløften & Kløften A/S, Oslo, Norway

[21] Appl. No.: 601,950

[22] Filed: Apr. 19, 1984

[51] Int. Cl.⁴ .............................................. B23K 1/12
[52] U.S. Cl. ................. 219/85 G; 219/85 R; 219/106; 228/5.7
[58] Field of Search ............... 219/85 M, 85 H, 85 R, 219/85 CA, 85 CM, 85 BA, 85 F, 85 G, 106; 228/5.7, 246–247, 249–250

[56] References Cited

U.S. PATENT DOCUMENTS

| | | | |
|---|---|---|---|
| 1,308,781 | 7/1919 | Gravell | 219/106 |
| 1,357,080 | 10/1920 | Peck | 219/85 CA |
| 2,618,726 | 11/1952 | Cameron | 219/106 |
| 3,223,815 | 12/1965 | Gembicki | 219/9.5 |
| 3,585,346 | 6/1971 | Jackson | 219/85 G |
| 3,657,789 | 4/1972 | Anglade | 29/56.6 |
| 3,710,481 | 1/1973 | Stroh | 219/85 A |
| 3,857,013 | 12/1974 | Niesse | 219/85 |
| 4,110,592 | 8/1978 | Ege | 219/85 M |
| 4,220,845 | 9/1980 | Morreale | 219/243 |
| 4,359,623 | 11/1982 | Fanning | 219/85 F X |

Primary Examiner—C. L. Albritton
Assistant Examiner—Catherine M. Sigda
Attorney, Agent, or Firm—Victor F. Volk

[57] ABSTRACT

The guide plates of a soldering apparatus for carrier strip are provided with grooves and slide bars that fit the grooves. The bars have pins fitting holes in the strip and means for precisely positioning the bars lengthwise in the grooves.

9 Claims, 10 Drawing Figures

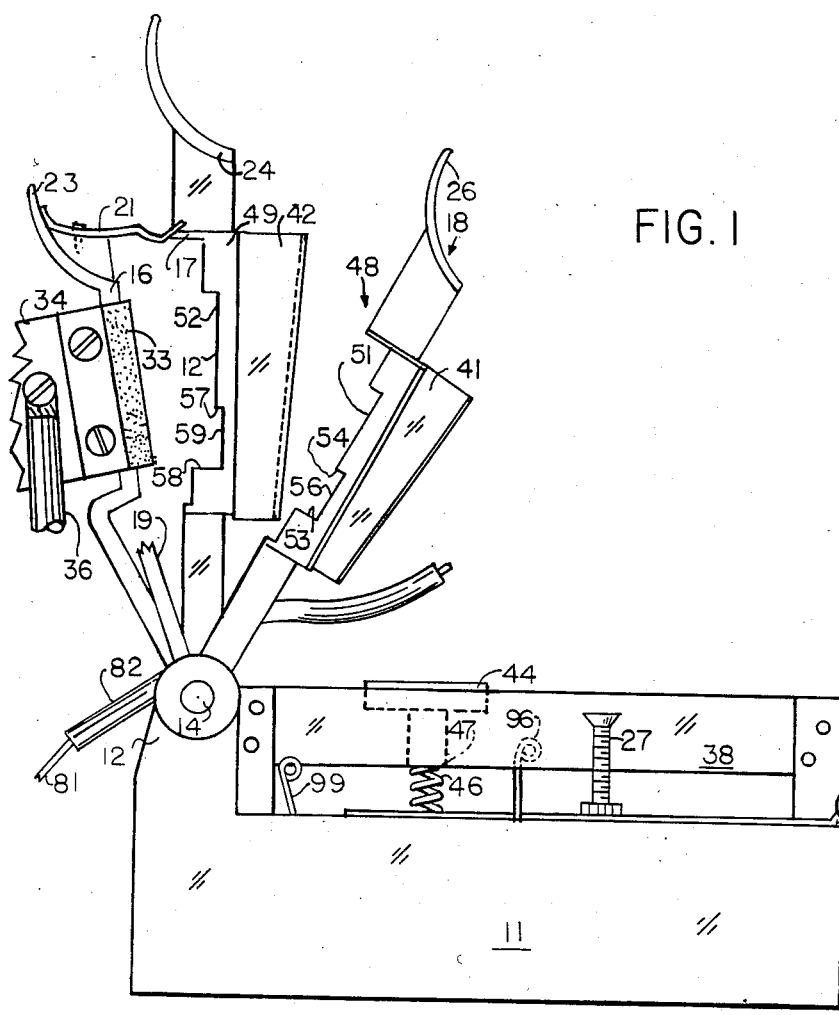
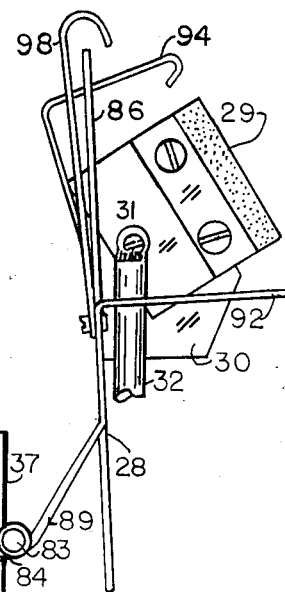
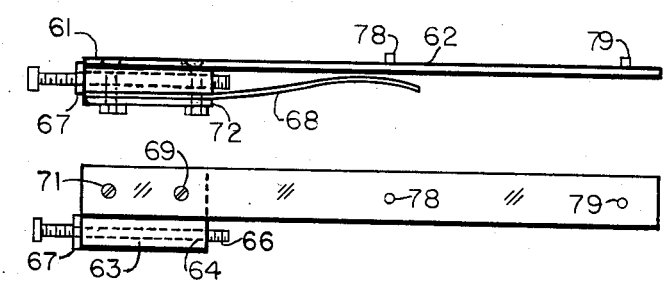
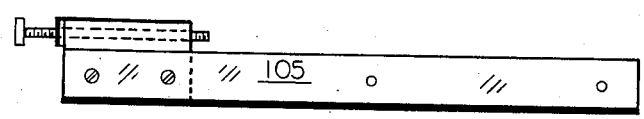

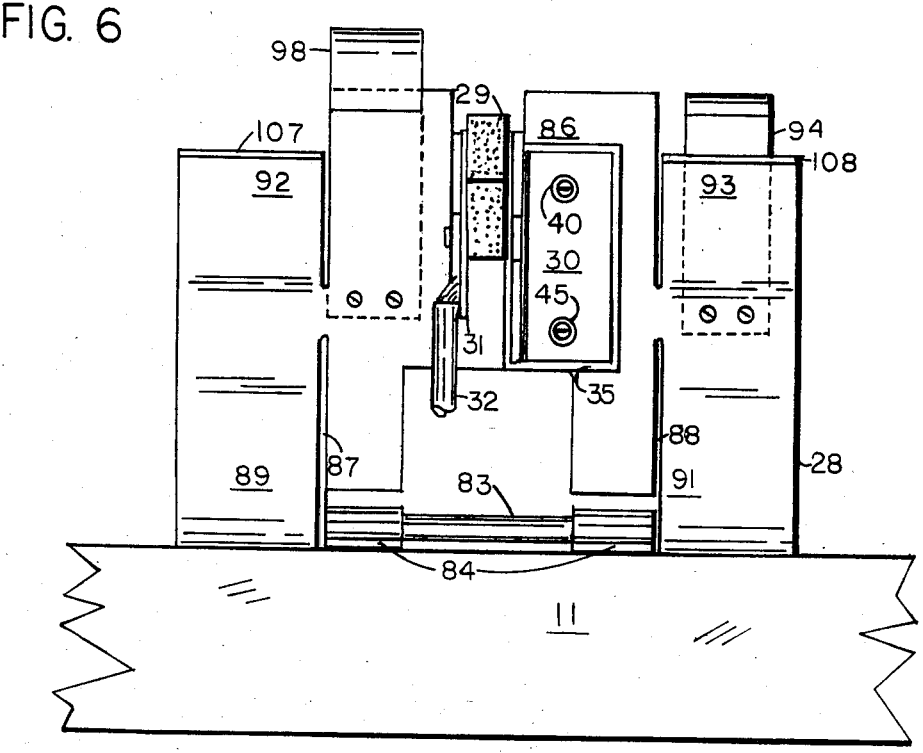
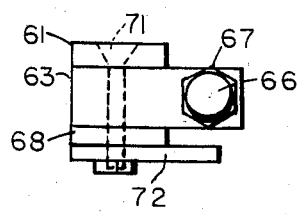
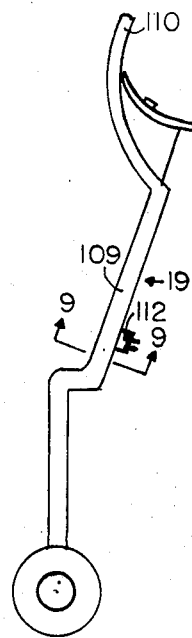
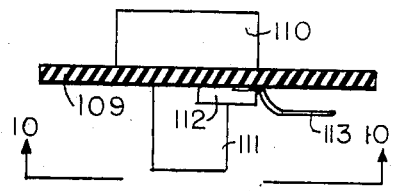
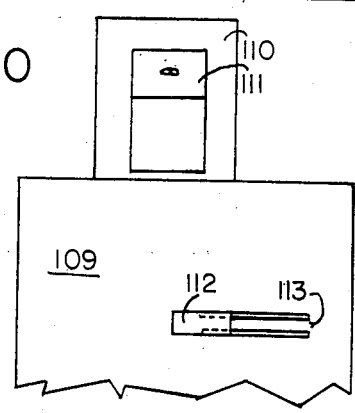

TAPE SPLICER TO SPLICE CARRIER STRIP

BACKGROUND OF THE INVENTION

Apparatus has been known to butt splice copper-base tapes, using silver solder. A method for such splicing is described in applicant's U.S. Pat. No. 4,110,592, the disclosures of which are incorporated herein by reference. This prior art apparatus, however, has not proven satisfactory for splicing carrier strip, by which I refer to metal strip of indefinite length in which a narrow ribbon of the metal bears recurrent elements that have been stamped and formed from a flat strip which was originally much wider than the ribbon. A form of carrier strip to which my invention has immediate commercial application is connector strip in which the recurrent elements consist of electrical connectors. With the automation of the manufacture of electrical and, particularly, electronic equipment the use of carrier strip to feed connectors to the automated assembly machines is widespread and, indeed essential. The connector strip must, necessarily, be handled in rolls or pads of finite length, however, and when a trailing edge of one of these supply rolls is reached it is desirable to splice the leading edge of a new supply to it as quickly as possible so as to avoid a delay or shutdown of the overall manufacturing operation.

While both the trailing and leading edges of plain tape to be spliced may be trimmed at any point in its length this is not true of connector strip which must be so spliced that it retains the even spacing of the connectors throughout the whole spliced length, in order to be accepted by the automated assembly machines.

SUMMARY OF THE INVENTION

I have invented an apparatus for splicing carrier strip which has elements projecting at regular intervals and, typically, may have holes through the strip spaced regularly along its length. My apparatus has at least one, and preferably two, cutting blades for the strip, two guide plates each of which a length of strip beneath one of the blades, and means for advancing a ribbon of solder across the cut ends of the two strips. The guide plates comprise planar upper surfaces upon which the projecting elements can slide and walls that define straight, lengthwise grooves. There is a guide bar slidably fitting each of the grooves, means such as pins that fit into the holes in the strip, projecting from the bars, for removably holding the strips to the bars and means for fusing the solder to bond the strips together. Preferably an outer flat surface of the guide bars is flush with the planar surface of associated guide plates and each bar has a spring clip slidably securing it to one of the guide plates.

Advantageously, my apparatus includes adjusting means such, preferably, as short rectangular blocks fixed to the lower surface of each of the guide bars in a position remote from one end of the bar. The blocks comprise portions that extend laterally beyond the lengthwise edges of the bars and have lengthwise bores through these portions. Rods that are longer than the blocks are fitted through these bores and there are means for adjusting the positions of the rods in the bores. Spring clips that extend along the lower surfaces of the bars are fixed to them for slidably gripping plates between the clips and the bar surfaces.

My apparatus may preferably also comprise two holding plates that fit against the guide plates to clamp the carrier strip and the guide bars. The holding plates comprise spring means urgable against the carrier strip means urgable against the carrier strip in proximity to one or more of the pins.

BRIEF DESCRIPTION OF THE DRAWING

FIG. 1 shows a side elevation of the apparatus of my invention.

FIG. 2 shows a side view of a guide bar used in my apparatus.

FIG. 3 shows a top view of the guide bar of FIG. 2.

FIG. 4 shows an enlarged end view of the guide bar of FIG. 2.

FIG. 6 shows a view of the brush holding assembly 28 raised so that the strips 89, 91 are vertical.

FIG. 7 shows a top view of a matching guide bar used in my apparatus.

FIG. 8 shows a side elevation of an upper jaw of my apparatus.

FIG. 9 shows a view of the section 9—9 of FIG. 8.

FIG. 10 shows a view from the position 10—10 of FIG. 9.

DETAILED DESCRIPTION OF A PREFERRED EMBODIMENT

Figure 5:
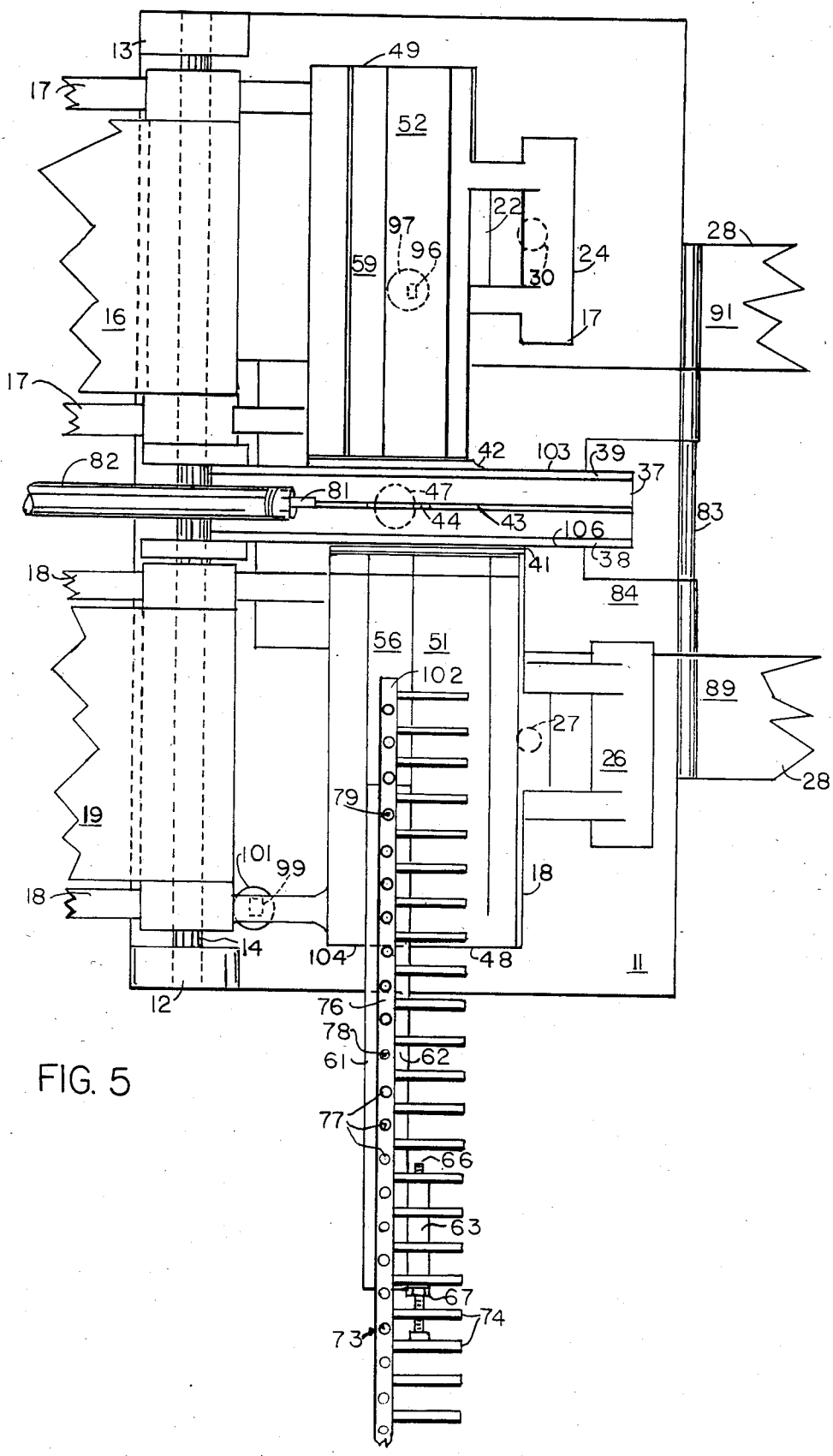
FIG. 5 shows a plan view of my apparatus with the jaws and assembly 28 swung out of the view.

Referring first to FIGS. 1 and 5, a base 11 of my apparatus supports standards 12, 13 for a lengthwise shaft 14 on which are hinged two sets of jaws consisting of an upper jaw 16 with matching lower jaw 17 and lower jaw 18 with a matching upper jaw 19 (cut away for clarity in FIG. 1, see also FIG. 8). A spring clip 21 on the upper jaw 16 engages an edge 22 (FIG. 5) of the jaw 17 when the two jaws are brought together, and a similar spring clip 111 (FIGS. 8-10) permits the upper and lower jaws 19, 18 to be secured together. Handles 23, 24, 26 permit the respective jaws 16, 17, 18 to be rotated around the shaft 14 as does a similar handle 110 (FIG. 8) for the jaw 19.

Projecting upwardly from the base 11 is a vertical stop 27 which stops downward movement of the lower jaw 18. A similar stop 30 (FIG. 5) limits movement of the jaw 17. These two stops also limit the downward movement of an assembly 28 which includes a carbon brush 29 bolted to a copper plate 31 which receives current through an insulated cable 32. A matching carbon brush 33, copper plate 34, and insulated cable 36 are fastened to the inner end of the jaw 16 in such a manner that when the assembly 28 has been lowered onto the stops 27, 30 lowering of the jaw 16 will bring the brush 33 to rest on the brush 29 for passage of current between them from an appropriate transformer and timer of known construction (not shown).

A center block 37 having outer steel shear plates 38, 39 that cooperate respectively with shear blades 41, 42 has a central slot 43 for a thin plate 44 urged upwardly by a compression spring 46 in a cylindrical opening 47 of the block 37. The blade 41 is bolted to the jaw 18 and the blade 42 is bolted to the jaw 17 so that lowering these blades will shear any strip that is laid across the plates 38, 39. The portions of the lower jaws 17, 18 to which the blades 41, 42 are bolted constitute respective guide plates 49, 48 for directing strips to be cut and joined. The plate 48 has a planar surface 51 and the plate 49 has a planar surface 52. Walls 53, 54 in the plate 48 define a lengthwise groove 56 and corresponding walls 57, 58 in the plate 49 define a lengthwise groove 59. The grooves 58, 59 are machined to closely fit guide bars 61, 105 (FIGS. 2, 3, 4, 7) so that an upper surface 62 of the bars is flush with the surface 51. A block 63 bolted to the bar 61 has a threaded bore 64 for a threaded rod 66 that can be set in place by tightening nut 67. Although I have to thread the bore 64 and rod 66 it will be understood that other means, such for example as an unthreaded rod and set screw, may be used within the scope of my invention for the described purpose. A spring clip 68 is bolted to the bar 61 by bolts 69, 71 that also secure the block 63 along with a rectangular washer 72. The clip 68 engages the plate 48 and holds the bar 61 slidably in the groove 56. A connector strip 73, of great length, to be spliced to the trailing end of another such strip (not shown) has a series of evenly spaced connectors 74 integrally attached to a metallic ribbon 76 of a copper base alloy with uniformly spaced perforations 77. Short pins 78, 79 projecting upwardly from the surface 62 are spaced to coincide with two of the perforations 77 so that a forward or rearward movement of the bar 61 advances or retracts the strip 73 while the connectors 74 are slidably supported on the surface 51.

A ribbon 81 of silver solder is precisely advanced through a guide tube 82 to a predetermined distance depending on the width of the ribbon 76 and accomplished by a commercially available stepping motor and feeding rolls (not shown).

The assembly 28 (FIGS. 5 and 6) pivots on a rod 83 fastened to the base 11 by a hinge plate 84. The principal member of the assembly 28 comprises a plate 86 slotted at lines 87, 88 to permit strips 89, 91 to be bent back for hinging to the rod 83 and bent forward to form strips 92, 93 that engage the spring clip 21 on the jaw 16 and a comparable clip 111 on the jaw 19 when the assembly 28 has been fully rotated counterclockwise (as viewed in FIG. 1) against the stops 27, 30 and the jaws 18, 19 rotated clockwise. A resilient strip 94, bolted to the plate 86 is bent so that it projects upwardly when the assembly 28 is in its soldering position. Then, when the jaw 17 is lowered, it forces the strip 94 against a switch member 96 projecting upwardly through a hole 97 in the top of the base 11. Depression of switch member 96 allows current to flow between the brushes 29 and 33. Lowering of the jaw 17 has no effect on the switch unless the assembly 28 has been lowered first. Another resilient strip 98, bolted to the plate 86 interacts with the lowering of the jaw 18 to depress a switch member 99, projecting upwardly through a hole 101 in the top of the base 11 and activates the stepping motor that advances solder strip 81 through the tube 82. The brush 29 carried by the assembly 28 and the copper plate 31 are both supported on a bent plate 30, insulated from the plate 86 by an insulating pad 35 and insulating washers 40, 45 (FIG. 6).

Referring now to FIGS. 8–10, the upper jaw 19 is seen to comprise a plate 109 that fits over the plate 48 of the jaw 18 when the two jaws are brought together. A small block 112 is bolted to the underside of the plate 109 in a position that will bring it over the groove 56 and over the ribbon 76 when the bar 61 is in the groove bearing the connector strip 73 and the jaws 19, 18 are brought together. The block 112 keeps the ribbon 76 from leaving the pins 78, 79. A pair of wire springs 113 are anchored under the block 112 and bent downwardly so that when the jaws are closed the springs make first contact against the ribbon 76 at points on both sides of the pin 79, pressing the ribbon down firmly at the pin so that even if the pins are slightly tapered, which may be done to ease removal of the ribbon from the pins, there will be a minimum of movement between the ribbon 76 and the bar 61. Comparable features are also comprised in the jaw 16 that fits over the plate 48 of the jaw 18.

OPERATION

In the operation of my apparatus all the jaws are first raised and the assembly 28 rotated out of the way. A switch (not shown) is then thrown to connect a source of electric current. The lower jaw 18 is then lowered onto the stop 27 while the upper jaw 19 remains raised. The bar 61 is placed in the groove 56 and the connector strip 73 is placed over the bar with two of the holes 77 in the ribbon 76 fitted over the pins 78, 79 in a manner that allows a substantial forward length 102 of the strip 73 projecting beyond the bar 61. The extent of the length 102 is sufficient to reach beyond a cutting edge 103 of the shear plate 39. Since it is essential that the final spliced connector strip should not have any variance in the even spacing of holes 77, cutting of the ribbon 73 must be precise relative to these holes. This is accomplished by pre-setting the screw 66 and locking the nut 67 in such a position that forward sliding of the bar 61 reaches the desired distance when the screw 66 strikes an edge 104 of the plate 48. If, for any reason, it is found that adjustment is required of the point at which the strip is cut, my apparatus provides for a simple adjustment by means of the screw 66. The thin plate 44 is depressed against the spring 46 by the length 102 over the block 37 while the strip is being cut. The actual cutting is accomplished by bringing down the jaw 17 with its attached blade 42.

After the end of the strip has been cut the bar 61 is retracted to allow the thin plate 44 to rise. The bar 61 is then again advanced until the cut end of the strip strikes the thin plate 44. Thereupon the upper jaw 19 is clamped down upon the lower jaw 18 to hold the strips 73 firmly in place. While still clamped together, both of the jaws 18, 19 are then raised. The above described operation is then repeated for the jaw 17 where a bar 105 which is a mirror image of the bar 61 is slid in the groove 59 carrying the trailing edge of a strip identical to the strip 73 t which it is to be joined. In this case, however, the strip is cut by lowering the jaws 18 and 19 together thus bringing down the blade 41 against a cutting edge 106. After the bar 105 has been drawn back and then forward to butt the cut end of the strip against the thin plate 44 the jaw 16 is pressed down against the jaw 17 snapping the clip 21 over the edge 22. All four jaws are then raised. Note, however, that before any of the strips are cut any of the connectors that are attached at the section to be cut should be broken off by hand before the blades are brought down.

The jaws having been now raised the assembly 28 is lowered until the plate 86 rests on the stops 27, 30 bringing the brush 29 into soldering position. Jaws 18, 19 are then brought down together, the clip on the jaw 19 snapping over an edge 107 (FIG. 6) of the strip 92. This has the effect of placing a short leading length of the ribbon 76 directly upon the brush 29. It also activates the stepping motor to advance the solder strip 81 with about half its width directly covering that portion of the connector strip ribbon that is on the brush. The jaws 16, 17 are now sharply lowered, the clip 21 snapping over an edge 108 of the strip 93. This places the trailing edge of the connector strip ribbon that is being held between the jaws to descend upon the solder strip that has been positioned over the brush 29. Lowering the jaws 16, 17 finally has the effect of bringing the brush 33 down against the brush 29 and also switching on the flow of current to effect a soldered splice. The two upper jaws 18, 19 are then raised, separating them from the lower jaws 17, 18 to release the spliced connector strip.

The foregoing description has been exemplary rather than definitive of my invention for which I desire an award of Letters Patent as defined in the appended claims.

I claim:

1. An apparatus for splicing carrier strip which has a metallic ribbon with a large plurality of elements projecting therefrom at regular intervals, comprising:
   (A) at least one cutting blade for the ribbon of a carrier strip,
   (B) two guide plates, each directing a length of strip so as to be cut in said apparatus, said guide plates each comprising a planar upper surface supporting elements that project from a ribbon of a carrier strip,
   (C) walls defining a lengthwise groove in each of said guide plates,
   (D) guide bars slidably fitting each of said grooves,
   (E) means removably holding carrier strips to said bars,
   (F) means for applying solder to the ends of two carrier strip ribbons,
   (G) means for fusing said solder thereby bonding together two carrier strips.

2. The apparatus of claim 1 wherein a carrier strip to be spliced comprises holes spaced regularly in a ribbon thereof and said holding means comprise at least one pin projecting from each of said bars and fitting into the holes in the ribbon.

3. The apparatus of claim 1 wherein each of said bars comprises an upper flat surface flush with the planar upper surface of an associated one of said guide plates.

4. The apparatus of claim 2 wherein each of said bars comprises an upper flat surface flush with the planar upper surface of an associated one of said guide plates, said pins projecting from said upper flat surface.

5. The apparatus of claim 1 wherein said bars comprise adjusting means for precisely positioning said bars lengthwise relative to said guide plates.

6. The apparatus of claim 1 comprising means slidably securing said bars to said guide plates.

7. The apparatus of claim 6 wherein said securing means comprise spring clips fixed to said bars against the lower surfaces thereof.

8. A device for guiding carrier strip into a splicing apparatus comprising:
   (A) an elongated bar member comprising upper and lower flat surfaces,
   (B) at least one guide pin projecting upwardly from said upper surface,
   (C) a block attached to said lower surface in a position remote from one end of said bar member,
      (a) said block comprising a portion extending laterally from a lengthwise edge of said bar,
      (b) a lengthwise bore through said portion,
      (c) a rod through said bore, said rod being longer than said block,
      (d) means for adjusting the position of said rod in said block,
   (D) a spring clip fixed to said device and extending along a length of said lower surface, said clip and said lower surface cooperating to grip a plate therebetween.

9. The apparatus of claim 2 comprising two holding plates each fitting against one of said guide plates to clamp said carrier strip and said guide bars, said holding plates comprising spring means urging said strip against said guide plate in proximity to one of said pins.

* * * * *